March 20, 1928.
T. H. SYMINGTON ET AL
TRUCK BOLSTER WITH ABSORPTION MECHANISM
Filed Feb. 21, 1927
1,663,394
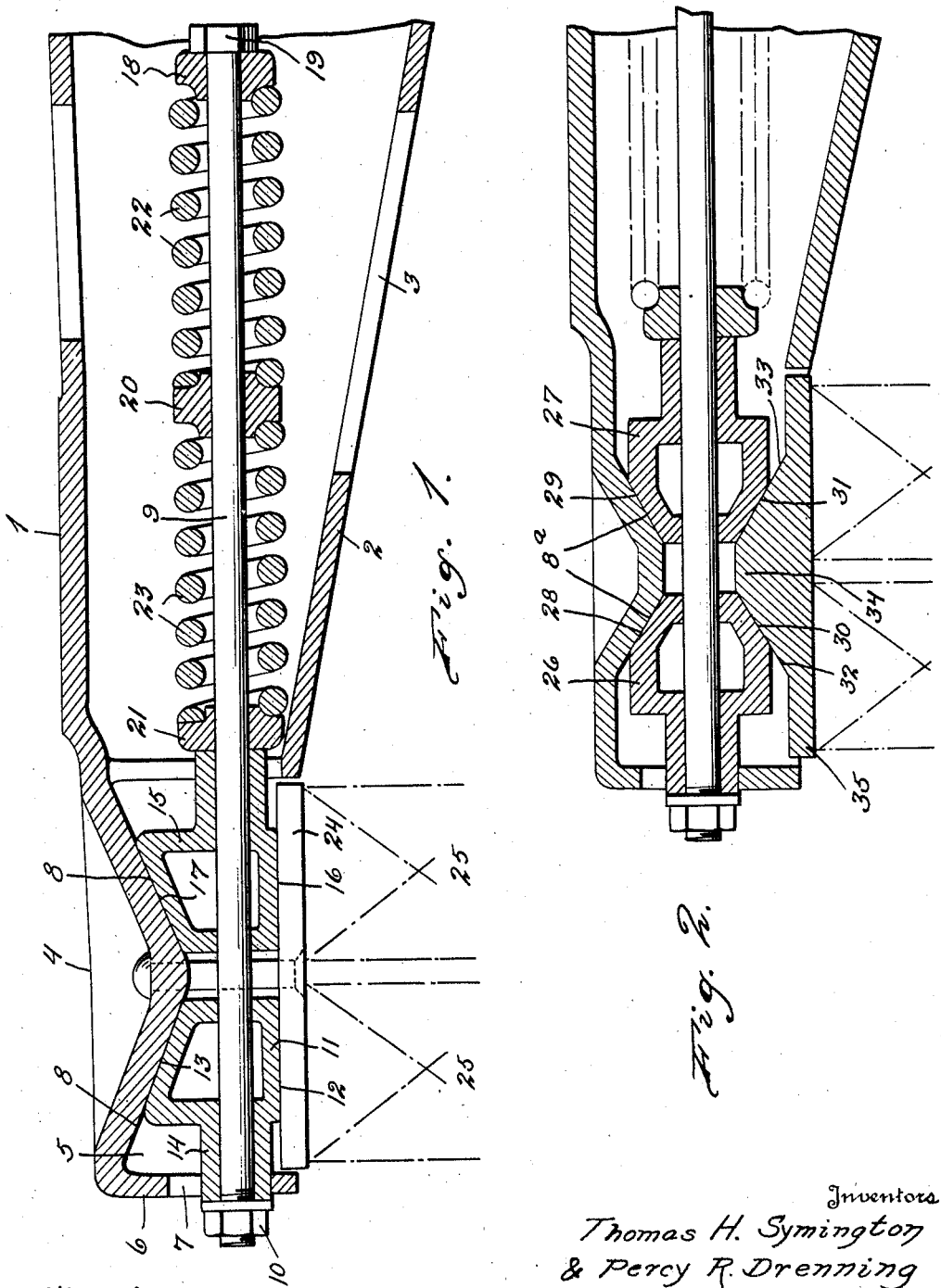
Inventors
Thomas H. Symington
& Percy R. Drenning
By Ernest S. Mechlin
Attorney
Witness
John Milton Jester Patented Mar. 20, 1928.

1,663,394

UNITED STATES PATENT OFFICE.

THOMAS HARRISON SYMINGTON AND PERCY R. DRENNING, OF BALTIMORE, MARYLAND, ASSIGNORS TO T. H. SYMINGTON & SON, INC., OF BALTIMORE, MARYLAND, A CORPORATION OF MARYLAND.

TRUCK BOLSTER WITH ABSORPTION MECHANISM.

Original application filed October 7, 1926, Serial No. 140,181. Patented September 20, 1917, Patent No. 1,642,751. Divided and this application filed February 21, 1927. Serial No. 169,916.

The present application is a division of our co-pending application for patent for truck bolsters with absorption mechanism filed October 7th, 1926, Serial No. 140,181.

The invention relates to truck bolsters for use in connection with railway car trucks.

The principal object of the invention, generally stated, is to provide a novel shock absorbing mechanism within a truck bolster and embodying resilient means cooperating with and acting in series with respect to whatever spring supporting means may be provided for the bolster.

An important object of the invention is to provide a bolster equipped internally with a combination of resilient and friction means acting in conjunction and in series with the truck springs, the entire mechanism increasing the spring capacity and avoiding overloads on the truck springs.

One of the objects of the invention is to provide a bolster with an internal resilient means having considerable travel, which means acts in series with the bolster supporting springs, the increase in travel enabling the truck to negotiate out of surface track with greater safety.

A more specific object of the invention is to provide a bolster with an internally located cushion and friction mechanism embodying coacting wedge elements or members operating in conjunction with springs, the combined action absorbing shocks and jars and increasing the capacity of the truck springs.

Still another object is the provision of a bolster in which means is provided for maintaining the wedge elements in place prior to installation within the truck so that dislocation or loss of the parts in handling will be avoided.

An additional object of the invention is to provide a bolster which, though equipped with the shock absorbing means or increased capacity producing means, may be used to replace any of the standard types of bolsters without necessitating any changes or modifications in the construction of the side frames or other parts.

A further object of the invention is the provision of a mechanism of this character which will be simple and inexpensive to manufacture, easy to install, positive in action, efficient and durable in service, and a general improvement in the art.

With the above and other objects and advantages in view, the invention preferably consists in the arrangement and combination of parts and detailed structural features to be hereinafter more fully described and claimed, and illustrated in the accompanying drawing in which:

Figure 1 is a longitudinal vertical section through one end portion of a truck bolster embodying one form of the invention, and Figure 2 is a similar view illustrating a modification.

Referring more particularly to the drawing, the numeral 1 designates the body of the bolster which is of the usual hollow formation and which may have any desired specific shape to correspond generally to the accepted standards. It is immaterial whether the bolster be provided with a center bearing and with side bearings, or with side bearings alone with merely a center guide and for this reason no such bearings are disclosed. It should be mentioned that only one end of the bolster is illustrated for the reason that both ends are identically the same and a complete description of one is entirely sufficient. The major portion of the bottom of the bolster 2 is represented as closed except for an opening 3 which may be provided to permit the egress of any dirt or water and to permit access to the internal mechanism to be described so as to facilitate the installation thereof. Each end portion 4 is open at the bottom and otherwise formed to define a pocket 5, the outer end wall 6 of which is closed except for a vertically elongated slot 7 therein. The ends 4 furthermore have their top walls formed with oppositely inclined and upwardly diverging surfaces 8 acting as wedge members or portions in a manner to be described.

The ends 4 of the bolster are intended to extend into or be located within the window openings of truck side frames and to be supported by whatever spring devices may be provided for the purpose, though not directly as the present invention provides interposed means which will act to absorb shocks and vibration and to increase the spring capacity and travel.

This absorption mechanism preferably comprises an elongated rod 9 located within each end portion of the bolster and slidable longitudinally thereof. Mounted upon the outer end of each rod and restrained against movement longitudinally thereof, as by a nut 10 or the like, is a wedge member 11 having a flat bottom surface 12 and an inclined upper surface 13 corresponding to and conformingly engaging against the outer one of the inclined surfaces 8 at the top of the bolster. This wedge member has a hub portion 14 accommodated within the slot 7 so that the wedge member may have vertical movement with respect to the bolster as well as longitudinal movement. Slidable upon each rod 9 is a similar wedge member 15 having a flat bottom surface 16 and an inclined top surface 17 conformingly engaging against the other inclined surface 8 at the top of the bolster. This wedge member is capable of longitudinal and vertical movement with respect to the bolster in exactly the same manner as the wedge member 11.

The rod 9 carries an abutment member or washer 18 at its inner end provented from longitudinal movement with respect to the rod as by the member 19 which may be in the nature of a bolt head formed on the rod 9, though clearly there is absolutely no limitation in this respect as any other equivalent means may be provided if found desirable. Slidable upon the rod 9 are other abutment members or washers 20 and 21, the latter of which abuts against the inner end of the hub portion of the wedge member 15, and the former of which is located at a point intermediate the abutment members 18 and 21. Coil springs 22 and 23 surround the rod 9, the former engaging against the abutment members 18 and 20 and the latter engaging against the abutment members 20 and 21. It is conceivable that a slightly different spring arrangement might be provided though in actual practice we have discovered that the combination disclosed is highly desirable and practical.

Located within the open bottom portion of the pocket 5 is a spring seat member or follower 24 which is adapted to rest upon the truck springs indicated diagrammatically at 25, this seat member being located beneath and constituting a support for both wedge members 11 and 15.

In the modification shown in Figure 2, the construction is substantially the same except that the wedge members 11 and 15 are replaced by other wedge members 26 and 27 which have inclined surfaces 28 and 29 at the top for coaction with the inclined surfaces 8ª at the top of the bolster, and which also have inclined surfaces 30 and 31 at the bottom coacting with the opposite inclined surfaces 32 and 33, respectively, on a wedge member 34 which may be attached to or which may form an integral part of a combined spring seat and follower 35 corresponding to the follower 24 and similarly adapted to be supported upon the truck springs.

In the operation of both forms of the invention, it will be apparent that when a load is brought upon the bolster tending to move the spring seat or follower upwardly, the wedge members 11 and 15, or 26 and 27, as the case may be, will move outwardly and also upwardly along the coacting inclined surfaces formed at the top of the bolster. When this movement occurs the rod 9 of course moves vertically likewise and the springs 22 and 23 are compressed, the former by the outward movement of the outer wedge member and the latter by the inward movement of the inner wedge member. Clearly, the springs are in series with the truck springs, as are also the wedge members. The position of the parts illustrated in the drawing is that which they will occupy under preliminary or light load conditions as the wedge members in both forms are shown at substantially the inner limit of their movement. As there is a considerable distance between the outer ends of the wedge members and the ends of the pockets there will be a long travel of the wedge members in moving from their extreme inner to their extreme outer positions, and as all of the wedge members and springs are in series with the truck springs it is obvious that the capacity of the truck springs will be greatly increased. The friction developed between the coacting inclined surfaces of the wedge members does highly useful work in that sudden movement of any of the parts under any circumstances will be prevented, the action being made smooth and even. As a result of this condition sudden shocks and jars as well as vibration will be absorbed and the so-called usual "jiggle" eliminated.

While we have shown and described preferred embodiments of the invention it should be understood that the disclosure is merely an exemplification of the principles involved and that the right is reserved to make all such changes in the details of construction as well as the arrangement and combination of parts as will increase the field of utility and adaptability of the device provided such modifications constitute no departure from the spirit of the invention or the scope of the claims hereunto appended.

Having thus described the invention, we claim:

1. In a truck bolster, a pocket in each end thereof, a vertical movable follower within each pocket adapted to seat upon the truck springs, wedge members mounted within the pocket and movable toward or from each other longitudinally of the bolster, means for opposing separating movement of the wedge members, and an intermediate wedge member in the pocket located between said wedge members.

2. A railway truck bolster having each end formed with a pocket open at its bottom, a member mounted within each pocket for vertical movement and adapted to seat upon the truck springs, a wedge member, a longitudinally extending rod within each end of the bolster and slidable longitudinally thereof, wedge members carried by said rod and disposed against opposite sides of the first named wedge member, and spring means urging said second named wedge members toward each other.

3. A railway truck bolster having each end formed with a pocket open at the bottom, a member vertically movable within the open bottom of the pocket and adapted to seat upon the truck springs, a wedge member at the top of the pocket, a pair of wedge members located at and cooperating with opposite sides of said first named wedge member, and spring means opposing outward movement of said pair of wedge members.

4. A truck bolster having each end formed with a pocket open at its bottom, a seat member vertically movably mounted within the open bottom of each pocket and adapted to seat upon the truck springs, a rod extending longitudinally within the bolster and capable of longitudinal and vertical movement therein, a pair of wedge members engaged upon said seat member and carried by said rod, a wedge member at the top of the bolster pocket located between and coacting with said wedge members, and means carried by said rod for opposing movement of said pair of wedge members away from each other.

5. A railway truck bolster having each end formed with a pocket open at the bottom, a seat member vertically movably mounted within each pocket and adapted to engage upon the truck springs, a longitudinally and vertically movable guide member within the bolster, a pair of wedges mounted on said guide member and resting upon said seat member, a wedge at the top of the pocket located between and cooperating with said pair of wedge members, and spring means opposing movement of said pair of wedge members away from each other.

6. A railway truck bolster having each end formed with a pocket open at the bottom, a seat member vertically movably mounted within each pocket and adapted to engage upon the truck springs, a longitudinally and vertically movable guide member within the bolster, a pair of wedges mounted on said guide member and resting upon said seat member, a wedge at the top of the pocket located between and cooperating with said pair of wedge members, and spring means opposing movement of said pair of wedge members away from each other, said spring means being carried by said guide means.

7. A railway truck bolster having each end formed with a pocket open at the bottom, a vertically movable seat member located at the open bottom and adapted to rest upon the truck springs, a rod located within each end of the bolster and extending longitudinally thereof and through the pocket, a wedge member fixed upon the rod, a second wedge member slidable upon the rod and arranged in opposed relation to the first named wedge member, a wedge member at the top of the pocket located between and cooperating with said wedge members, and spring means carried by the rod and arranged to oppose movement of said pair of wedge members away from each other.

8. A railway truck bolster having each end formed with a pocket open at the bottom, a vertically movable seat member located at the open bottom and adapted to rest upon the truck springs, a rod located within each end of the bolster and extending longitudinally thereof and through the pocket, a wedge member fixed upon the rod, a second wedge member slidable upon the rod and arranged in opposed relation to the first named wedge member, a wedge member at the top of the pocket located between and cooperating with said wedge members, spring means carried by the rod and urging it inwardly, and other spring means carried by the rod and engaging the second named wedge member for urging it outwardly.

9. A railway truck bolster having each end formed with a pocket open at the bottom, a vertically movable seat member located at the open bottom and adapted to rest upon the truck springs, a rod located within each end of the bolster and extending longitudinally thereof and through the pocket, a wedge member fixed upon the rod, a second wedge member slidable upon the rod and arranged in opposed relation to the first named wedge member, a wedge member at the top of the pocket located between and cooperating with said wedge members, and spring means carried by the rod and arranged to oppose movement of said pair of wedge members away from each other, said rod being movable vertically with the wedge members.

10. A railway truck bolster having each end formed with a pocket open at the bottom, a vertically movable seat member located at the open bottom and adapted to rest upon the truck springs, a rod located within each end of the bolster and extending longitudinally thereof and through the pocket, a wedge member fixed upon the rod, a second wedge member slidable upon the rod and arranged in opposed relation to the first named wedge member, a wedge member at the top of the pocket located between and cooperating with said wedge members, and spring means carried by the rod and arranged to oppose movement of said pair of wedge members away from each other, said rod being movable vertically with the wedge members, the end of the bolster having a vertically elongated slot for the accommodation of the rod during its vertical movement.

11. A truck bolster having each end formed with a pocket open at its bottom, a seat member vertically movably mounted within the open bottom of each pocket and adapted to seat upon the truck springs, a rod extending longitudinally within the bolster and capable of longitudinal and vertical movement therein, a pair of wedge members engaged upon said seat member and carried by said rod, a wedge member at the top of the bolster pocket located between and coacting with said wedge members, and means carried by said rod for opposing movement of said pair of wedge members away from each other, said seat member having an upstanding wedge portion thereon and said pair of wedge members having inclined lower surfaces coacting with the wedge portion of the seat member.

12. A truck bolster having each end formed with a pocket open at its bottom, a seat member vertically movably mounted within the open bottom of each pocket and adapted to seat upon the truck springs, a rod extending longitudinally within the bolster and capable of longitudinal and vertical movement therein, a pair of wedge members engaged upon said seat member and carried by said rod, a wedge member at the top of the bolster pocket located between and coacting with said wedge members, means carried by said rod for opposing movement of said pair of wedge members away from each other, said seat member having an upstanding wedge portion thereon and said pair of wedge members having inclined lower surfaces coacting with the wedge portion of the seat member, the wedge member at the top of the pocket corresponding to the wedge portion of the seat member, and the top and bottom of the pair of wedge members being similar.

13. A railway truck bolster having each end formed with a pocket open at the bottom, a vertically movable seat member within the open bottom having an upstanding wedge portion thereon, a wedge member located at the top of the bolster in alinement with said wedge portion, a pair of wedge members located between and coacting with said wedge portion and said wedge members, and means opposing relative outward movement of said pair of wedge members.

14. A railway truck bolster having each end formed with a pocket open at the bottom, a vertically movable seat member within the open bottom having an upstanding wedge portion thereon, a wedge member located at the top of the bolster in alinement with said wedge portion, a pair of wedge members located between and coacting with said wedge portion and said wedge member, and means opposing relative outward movement of said pair of wedge members, a rod fixed within one of said pair of wedge members and slidable through the other, said rod being capable of longitudinal and vertical movement with respect to the bolster.

15. In a truck bolster, a substantially vertically movable follower at each end adapted to seat upon the truck springs, movable wedge means within the bolster engaged by the follower, means opposing movement of said wedge means, and stationary wedge means within the bolster cooperating with said movable wedge means.

16. In a truck bolster, a follower substantially vertically movably mounted within each end thereof adapted for engagement with the truck springs, stationary wedge means within the bolster, and movable wedge means between the stationary wedge means and the follower.

17. A truck bolster provided interiorly of each end with friction producing wedges constituting absorption mechanism adapted to operate in series with the truck springs, one of the wedges being stationary with respect to the bolster.

18. A truck bolster provided interiorly of each end with friction absorption mechanism embodying relatively movable and relatively stationary wedges.

19. In a truck bolster, a substantially vertically movable follower at each end thereof adapted to seat upon the truck springs and having a wedge portion, movable wedge means within the bolster engaging said wedge portion, and stationary wedge means within the bolster cooperating with said movable wedge means.

In testimony whereof we affix our signatures.

THOMAS HARRISON SYMINGTON.
PERCY R. DRENNING.